US 9,172,473 B2

(12) United States Patent
Nguyen et al.

(10) Patent No.: US 9,172,473 B2
(45) Date of Patent: *Oct. 27, 2015

(54) ACTIVE LINEAR AMPLIFIER INSIDE TRANSMITTER MODULE

(71) Applicant: FINISAR CORPORATION, Sunnyvale, CA (US)

(72) Inventors: The'Linh Nguyen, San Jose, CA (US); Henry M. Daghighian, Menlo Park, CA (US)

(73) Assignee: FINISAR CORPORATION, SUNNYVALE, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/916,406

(22) Filed: Jun. 12, 2013

(65) Prior Publication Data

US 2014/0219665 A1    Aug. 7, 2014

Related U.S. Application Data

(63) Continuation of application No. 12/248,325, filed on Oct. 9, 2008, now Pat. No. 8,948,607.

(51) Int. Cl.
| | |
|---|---|
| *H04B 10/58* | (2013.01) |
| *H04B 10/564* | (2013.01) |
| *H04B 10/25* | (2013.01) |
| *H04L 25/03* | (2006.01) |
| *H04B 10/2575* | (2013.01) |

(52) U.S. Cl.
CPC .......... *H04B 10/564* (2013.01); *H04B 10/2504* (2013.01); *H04B 10/2575* (2013.01); *H04L 25/03847* (2013.01)

(58) Field of Classification Search
CPC ....................................................... H04B 10/504
USPC ........................................................ 398/199
See application file for complete search history.

(56) References Cited

U.S. PATENT DOCUMENTS

| | | | | |
|---|---|---|---|---|
| 6,037,832 | A * | 3/2000 | Kaminishi | .................... 327/538 |
| 6,618,406 | B1 * | 9/2003 | Kaminishi | ................. 372/38.02 |
| 8,948,607 | B2 * | 2/2015 | Nguyen et al. | ................ 398/182 |
| 2004/0174916 | A1 * | 9/2004 | Chujo et al. | ............... 372/38.02 |
| 2005/0089280 | A1 * | 4/2005 | Kumar et al. | ................... 385/88 |

OTHER PUBLICATIONS

"Operational Amplifiers: Design and Applications" Edited by Graeme et al., McGraw-Hill, 1971, pp. 132 and 436.*

* cited by examiner

*Primary Examiner* — Shi K Li
(74) *Attorney, Agent, or Firm* — Maschoff Brennan

(57) ABSTRACT

In one example embodiment, a transmitter module includes a header electrically coupled to a chassis ground. First and second input nodes are configured to receive a differential data signal. A buffer stage has a first node coupled to the first input node and a second node coupled to the second input node. An amplifier stage has a fifth node coupled to a third node of the buffer stage and a sixth node coupled to a signal ground that is not coupled to the chassis ground. An optical transmitter has an eighth node coupled to a seventh node of the amplifier stage and a ninth node configured to be coupled to a voltage source. A bias circuit is configured to couple a fourth node of the buffer stage to a bias current source.

12 Claims, 7 Drawing Sheets

ACTIVE LINEAR AMPLIFIER INSIDE TRANSMITTER MODULE

CROSS-REFERENCE TO RELATED APPLICATION

This patent application is a continuation of U.S. patent application Ser. No. 12/248,325, filed Oct. 9, 2008, which is incorporated herein by reference.

BACKGROUND OF THE INVENTION

1. The Field of the Invention

The present invention relates generally to optical transmitters. More specifically, some example embodiments relate to an amplifier circuit for use in optoelectronics devices for linearly amplifying a differential input signal.

2. The Related Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode ("LED") mounted on a header within a transmitter optical subassembly ("TOSA"). The optical transmitter emits light when current is passed there through, the intensity of the emitted light being a function of the current magnitude through the optical transmitter. Data reception is generally implemented by way of an optical receiver (referred to as an optoelectronic transducer), an example of which is a photodiode, which is generally housed within a receiver optical subassembly ("ROSA"). The optoelectronic transducer receives light and generates a current, the magnitude of the generated current being a function of the intensity of the received light. Both the TOSA and ROSA described above are typically included in an optoelectronic device (such as a transceiver or transponder) to enable the transmission and reception of optical signals on behalf of a host device in which the optoelectronic device is operably received.

Various other components are also employed by the optoelectronic device to aid in the control of the optical transmit and receive components, as well as the processing of various data and other signals. For example, such optoelectronic devices typically include a driver (e.g., referred to as a "laser driver" when used to drive a laser signal) configured to control the operation of the optical transmitter in response to various control inputs. The optoelectronic device also generally includes an amplifier (e.g., often referred to as a "post-amplifier") configured to perform various operations with respect to certain parameters of a data signal received by the optoelectronic transducer.

Traditional optoelectronic devices employ the above-described TOSA that contains a laser in a housing, which housing is configured to couple the optical output of the laser to an optical fiber. The TOSA is attached to a printed circuit board assembly ("PCBA") included in the optoelectronic device that contains circuitry, such as the laser driver, to bias and modulate the laser. The circuitry on the PCBA is relatively distant from the TOSA and the laser it contains.

Having the laser driver or other drive circuit located a relatively significant distance away from the laser creates a problem in maintaining good signal integrity. This is especially true for higher bit rates. Specifically, the TOSA and laser driver circuitry are ideally impedance matched to avoid signal reflection and distortion along the transmit path. Generally speaking, this will result in excess power dissipation beyond the minimum required by the laser itself.

Another problem associated with relatively large distances between the laser drive circuitry and the laser is manifested in an increased emission of Electromagnetic Interference ("EMI") from the optoelectronic device. The amount of EMI generated is proportional to both the drive current provided to the laser by the laser driver and the current loop formed there between.

Various solutions have been proposed or attempted for maintaining the signal fidelity from the laser driver to the laser and/or reducing the drive current and power consumption of an optoelectronic device by incorporating an amplifier positioned near the laser within the TOSA.

FIG. 1 illustrates an amplifier circuit 100 designed to reduce the power dissipated by an optoelectronic device. The circuit 100 is mounted on and grounded to a header 105 and includes an input node for receiving a single-ended signal over a transmission line 110, the single-ended signal being provided to the base terminal of a bipolar transistor 120. A return ground 130 coupled to the emitter terminal of the transistor 120 draws current through the transistor and consequently draws current through an optical transmitter 140 coupled to a voltage source 150. The amount of current drawn through the optical transmitter 140 depends on the single-ended signal applied at the base terminal of the bipolar transistor 120 via the transmission line 110.

Notwithstanding its ability to reduce laser driver current and thereby reduce EMI and overall power consumption, the amplifier circuit 100 shown in FIG. 1 nevertheless suffers from a number of disadvantages. First, maintaining signal fidelity of a single-ended signal is difficult as it requires a high fidelity radio frequency ("RF") ground to provide a return path for the signal. This requires a very low inductance ground in the signal return path. Moreover, since the RF ground is connected to the header and the header is usually required to be connected to the chassis ground of the optoelectronic device to help dissipate the heat, this can lead to a compliance problem in systems in which the optoelectronic device's chassis is required to be separated from the signal ground. Second, the linear range of the amplifier 120 is limited. When the transistor 120 operates beyond its linear range, waveform shaping of the single-ended received signal is not preserved in the amplified output signal.

FIG. 2 illustrates a differential amplifier and laser circuit 200 designed to maintain signal fidelity. The circuit 200 is mounted on a header 205 and includes two input nodes for receiving differential data signals over differential transmission line 210, a positive signal of the differential signal pair being provided to the base terminal of a first bipolar transistor 220 and a complementary signal being provided to the base terminal of a second bipolar transistor 230. The collector of the second transistor 230 is coupled to an optical transmitter 240, and the emitter terminals of both transistors 220 and 240 are coupled to a current source 250. The current source 250 draws current through either the bipolar transistor 220 or the bipolar transistor 230, or through both of the bipolar transistors 220 and 230 in a split manner. The amount of current drawn through the optical transmitter 240 depends on the differential data signals applied at the base terminal of the corresponding bipolar transistors 220 and 230.

Despite maintaining signal fidelity via its use of a differentially driven signal, the circuit 200 has numerous disadvantages. First, it dissipates a significant amount of power, half of the power being dissipated through the first transistor 220 without drawing current through the optical transmitter 240. Second, the amplifier circuit 200 is not a linear amplifier, but rather digital. Thus, any waveform shaping performed on the differential signal prior to being provided to the circuit 200 is not preserved when the signal is amplified.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In general, example embodiments of the invention relate to an active linear amplifier circuit for a transmitter module.

In one example embodiment, a transmitter module includes a header electrically coupled to a chassis ground. A first input node is configured to receive a first data signal. A second input node is configured to receive a second data signal that is complementary of the first data signal. A buffer stage has a first input node coupled to the first input node and a second node coupled to the second input node. An amplifier stage has a fifth node coupled to a third node of the buffer stage and a sixth node coupled to a signal ground that is not coupled to the chassis ground. An optical transmitter has an eighth node coupled to a seventh node of the amplifier stage and a ninth node configured to be coupled to a voltage source. A bias circuit is configured to couple a fourth node of the buffer stage to a bias current source.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with optoelectronic devices. More particularly, embodiments of the invention enable the use of differential signaling with a linear amplifier in a transmitter optical subassembly ("TOSA") or TOSA-like module of an optoelectronic device. Advantageously, embodiments of the invention permit a distributed feedback ("DFB") laser or other transmitter included in the TOSA or TOSA-like module to be used in a low power consuming circuit to achieve long reach optical signaling.

The present invention can be implemented in various optoelectronic devices. As used herein, the term "optoelectronic device" includes devices having both optical and electrical components. Examples of optoelectronic devices include, but are not limited to, transponders, transceivers, transmitters, and/or receivers. Optoelectronic devices can be used, for example, in telecommunications networks, local area networks, metro area networks, storage area networks, wide area networks, and the like. The principles of the present invention may be implemented in optoelectronic devices of any form factor currently available or that may be developed in the future for 1G, 2G, 4G, 10G, 40G, and 100G signaling, without restriction. It will be appreciated, however, that the optoelectronic devices need not comply with standardized form factor requirements and may have any size or configuration necessary according to a particular design. The principles of the present invention are suitable for use with, for example, 1G, 2G, and higher transmission speeds.

I. Example Operating Environment

Figure 3:
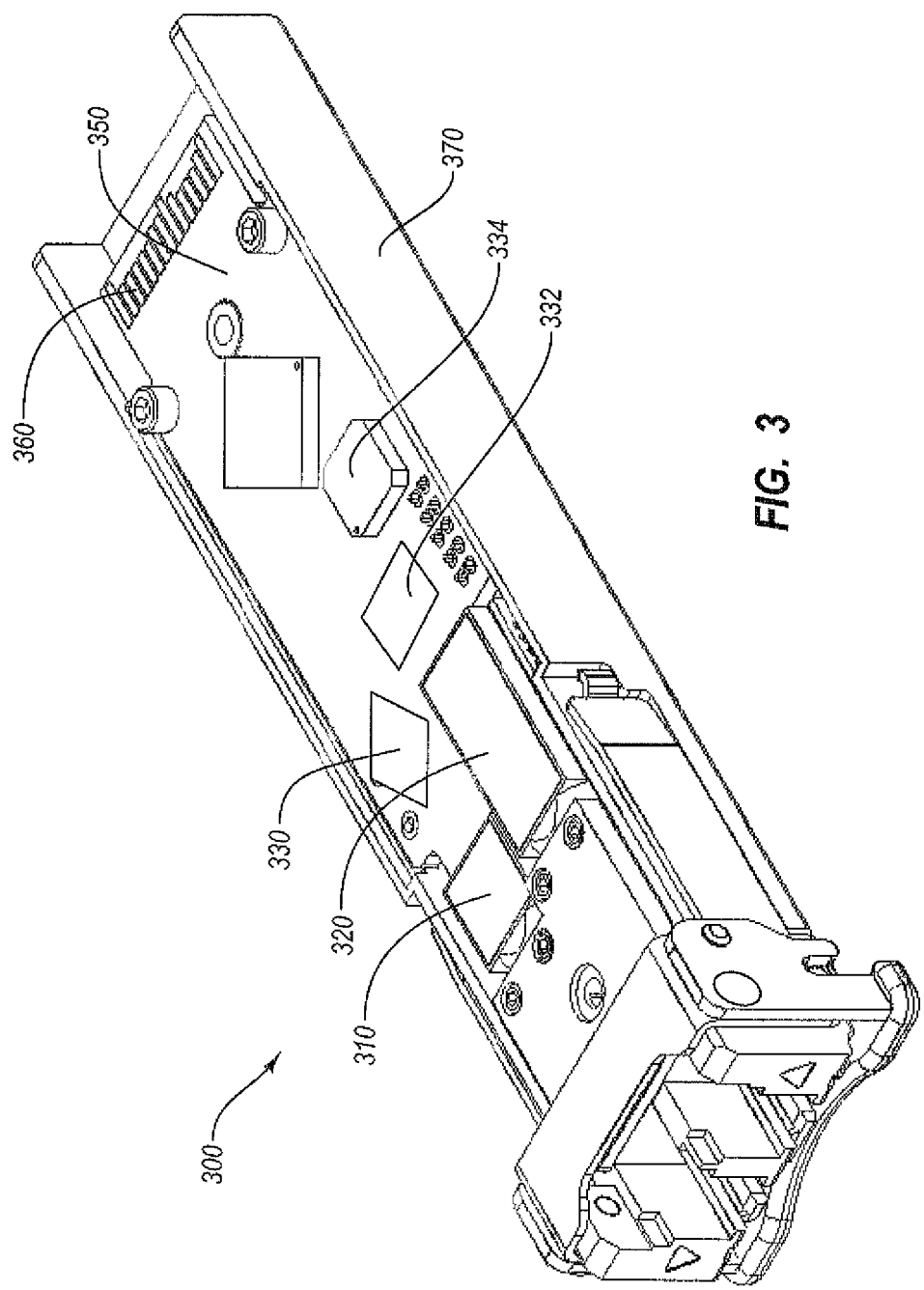
FIG. 3 is a perspective view of an example of an optoelectronic device including the present invention according to one embodiment.

Reference is now made to FIG. 3, which depicts a perspective view of an example optoelectronic device, generally designated at 300, for use in transmitting and receiving optical signals in connection with an external host that is operatively connected, in one embodiment, to a communications network. While the optoelectronic device 300 will be described in some detail, the device 300 is described by way of illustration only, and not by way of restricting the scope of the invention. As shown, the device 300 includes various components, including a Receiver Optical Subassembly ("ROSA") 310, a Transmitter Optical Subassembly ("TOSA") or intelligent transmitter module ("ITM") 320, various electronic components 330, 332, and 334, such as one or more of a laser driver, post-amplifier, receive clock and data recovery ("CDR"), transmit CDR, TEC control circuitry, microcontroller, and the like, and a printed circuit board 350 which supports the electronic components 330, 332, and 334.

In the illustrated embodiment, two electrical interfaces (not shown) are used to electrically connect the ROSA 310 and the TOSA (or ITM) 320 to a plurality of conductive pads located (not shown) on the PCB 350. The electronic components 330, 332, 334 are also attached to the PCB 350. An edge connector 360 is located on an end of the PCB 350 to enable the device 300 to electrically and mechanically interface with a host (not shown). In addition, the above-mentioned components of the device 300 are partially housed within a housing 370. Though not shown, some embodiments include a shell that cooperates with the housing 370 to define an enclosure for components of the device 300.

Figure 4:
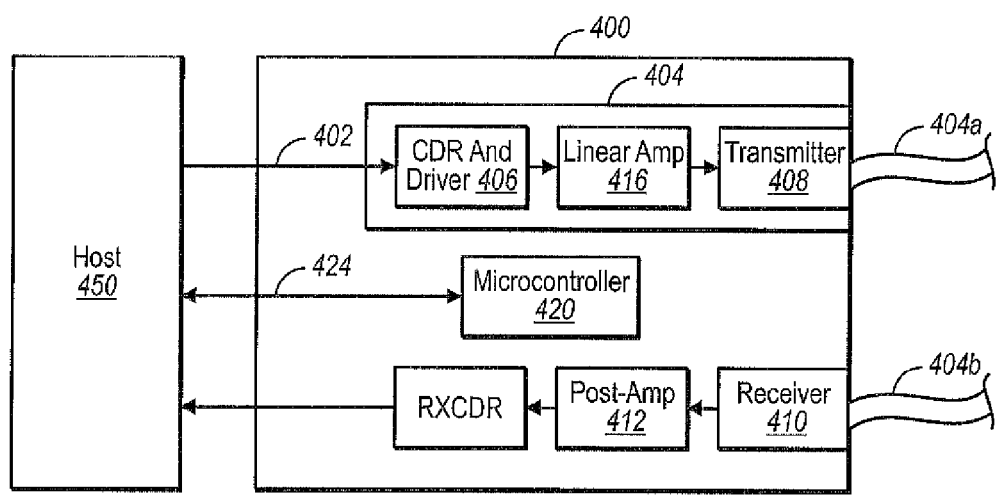
FIG. 4 is a simplified block view showing various aspects of an optoelectronic device, such as the device of FIG. 3.

Reference is now made to FIG. 4, which is a simplified block diagram of one embodiment of the optoelectronic device denoted at 300 in FIG. 3, depicting various physical and operational aspects of the transceiver. FIG. 4 further depicts the interaction between the device 400, a host 450, and fiber optic cables 404a, 404b. The optoelectronic device 400 can be implemented in optoelectronic devices conforming with any of a variety of different form factors, examples of which include, but are not limited to, XFP, SFP, SFP+ and SFF, as well as a variety of different communication protocols, examples of which include, but are not limited to, GiGE, SONET/SDH, and Fibre Channel.

During operation, the device 400 can receive a data-carrying electrical signal 402 from the host 450, which can be any computing system capable of communicating with the optical transceiver 400, for transmission as a data-carrying optical signal on to an optical fiber 404A. In one embodiment, the device 400 includes a TOSA-like module referred to herein as an intelligent transmitter module ("ITM") 408. The ITM 404 comprises a transmitter 408, active linear amplifier 416, CDR and driver 406, and optionally a microcontroller, all of which are mounted on a header (not shown). Embodiments of an intelligent transmitter module are described in U.S. patent application Ser. No. 11/968,581, entitled INTELLIGENT TRANSMITTER MODULE, filed Jan. 2, 2008, which is herein incorporated by reference in its entirety. Alternately, the device 400 may include a TOSA comprising a transmitter and a linear amplifier.

The received electrical signal 402 is first provided to the integrated CDR and driver 406 where the CDR portion equalizes and retimes the electrical data signal 402 using a clock signal from the host 450. In another embodiment, the CDR portion can equalize and retime the data signal 402 using the data signal itself, without using a clock signal. In some embodiments it is unnecessary to equalize and retime the data signal 402, in which case the CDR portion of the circuit 406 can be bypassed. While illustrated having a CDR within an ITM 404, the optoelectronic device 400 can alternately or additionally include a CDR external to a TOSA, or no CDR at all.

In one embodiment, the driver portion of the CDR and driver 406 is configured to perform wave-form shaping of the retimed electrical data signal, including one or more of pre-emphasis, de-emphasis, jitter pre-compensation, asymmetric rise fall time, asymmetric boost, and the like or any combination thereof. Alternately or additionally, a driver can be provided external to a TOSA, rather than integrated within the ITM 404 as illustrated. The modulation signal provided at the output of the CDR and driver 406 is amplified by active linear amplifier 416, embodiments of which will be described in greater detail below.

The transmitter 408 comprises a light source having any suitable configuration, including, but not limited to, a distributed feedback ("DFB") laser, a cooled or uncooled externally modulated laser ("EML"), an EML with a wavelocker, a cooled or uncooled directly modulated laser ("DML"), a DML with a wavelocker, and the like or any combination thereof. In one embodiment, the transmitter 408 comprises a laser with managed chirp, disclosed in U.S. patent application Ser. No. 10/289,944, filed Nov. 6, 2002, which is incorporated herein by reference in its entirety. Embodiments of a laser with managed chirp are marketed by the Finisar Corporation as Chirp Managed Laser CML™ transmitters.

Briefly, a laser with managed chirp comprises a light source and an optical spectrum reshaper ("OSR") or optical discriminator and may optionally include one or more thermo electric coolers ("TECs"), thermistors, a beam splitter, and one or more monitor photodiodes. In a typical embodiment, the light source of a laser with managed chirp is biased high above threshold to reduce transient chirp and is tuned to the transmission edge of the OSR. Adiabatic chirp in the light source blue shifts 1 bits relative to 0 bits. By properly tuning the light source and/or OSR (e.g., using TECs, temperature sensors, and monitor photodiodes), the 0 bits are attenuated while 1 bits are transmitted, thereby increasing the extinction ratio and reach of an emitted optical signal.

Returning to FIG. 4, the device 400 is additionally configured to receive a data-carrying optical signal from an optical fiber 404B using ROSA 410, which may correspond to the ROSA 310 of FIG. 3. The receiver 410 transforms received optical signals into electrical signals which can be amplified by the post-amplifier 412 prior to being provided to the host 450. Alternately or additionally, electrical signals amplified by post-amplifier 412 are equalized and retimed by a receive ("RX") CDR.

In one embodiment, the device 400 includes a microcontroller 420 which can be used for, among other things, optimizing the performance of the device 400. For example, temperature changes, power fluctuations, feedback conditions, and aging effects may each affect the performance of device components. The microcontroller 420 can evaluate conditions pertinent to transceiver operation, such as temperature, voltage or bias current, and receive information from the driver 406, post-amplifier 412, transmitter 408 and/or ROSA 410. The microcontroller 420 may optimize the dynamically varying performance of the transceiver 400 by adjusting settings on, for instance, the CDR and driver 406, transmitter 408 and/or post-amplifier 412. These settings adjustments can be intermittent and are generally only made when temperature or voltage or other low frequency changes so warrant. While illustrated as a discrete component outside of the ITM 404, the microcontroller can optionally be integrated with the CDR and driver 406 inside the ITM 404.

Data may be exchanged between the microcontroller 420 and host 450 using an appropriate interface or bus 424. In one embodiment, I²C is implemented as the data interface protocol between the host 450 and the controller 420 and data and clock signals may be provided from the host 450 using a serial clock line and a serial data line, both of which are represented in FIG. 4 by the bus 424. However, the principles of the present invention may also be implemented in systems which utilize SPI, MDIO, 1-wire, or any other suitable data interface protocol between the host 450 and the controller 420.

II. Example Embodiment of an Active Linear Amplifier

Figure 5A:
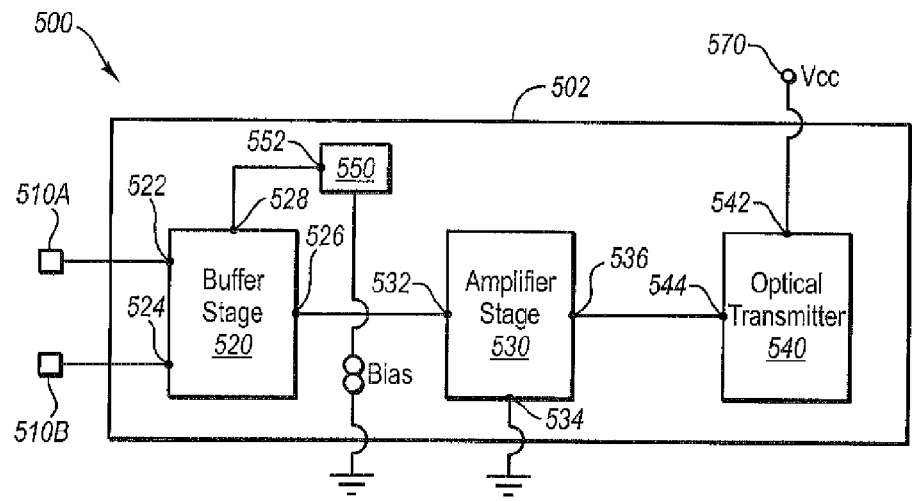
FIG. 5A is a block diagram of an active linear amplifier circuit, according to one embodiment.

Referring now to FIG. 5A, a block diagram of an example active linear amplifier circuit 500 is shown. The active linear amplifier circuit 500 may be mounted on a header 502 of a TOSA and/or ITM such as the TOSA 320 and/or ITM 420 of FIGS. 3 and 4, although this is not required. Note that the following description is for illustration only and should not be used to limit the scope of the appended claims or the embodiments disclosed herein.

The circuit 500 includes differential inputs 510A and 510B. The differential inputs each receive a portion of a differential signal from a driver output stage such as the driver portion of the CDR and driver 406 of FIG. 4. Alternately or additionally, the differential signals can be received over a differential transmission line from a driver output stage external to a TOSA in which the circuit 500 is implemented. Specifically, input node 510A receives the positive signal portion and input node 510B receives a complementary signal portion. The differential signal received at nodes 510A and 510B may be at a data rate of approximately 1 Gbit/s, 2 Gbit/s, 4 Gbit/s, 10 Gbit/s, or even higher data rates.

The circuit 500 further includes a buffer stage 520, an amplifier stage 530, an electro-optical transducer or transmitter stage 540, and a bias circuit 550. The buffer stage 520 has two nodes 522 and 524 for receiving the differential signals, the first node 522 being coupled to the differential input 510A and the second node 524 being coupled to the differential input 510B. Note that, as used herein, "coupled to" is defined to mean both a direct connection between two or more circuit objects without any intervening circuit objects and an indirect connection between two or more circuit objects with one or more intervening circuit objects. For example, two circuit objects directly connected to each other are "coupled to" one another. The same two circuit objects would also be "coupled to" each other if there were one or more intervening circuit objects connected between them.

The buffer stage 520 includes a third node 526 and a fourth node 528, the third node 526 being coupled to a first node 532 of the amplifier stage and the fourth node 528 being electrically coupled to the output node 552 of the bias circuit 550. The buffer stage 520 receives the differential signal and converts it to a single-ended signal which it provides to the amplifier stage 530. Additionally, the buffer stage 520 isolates the amplifier stage from the differential input 510A and 510B so that capacitance of the amplifier stage does not affect the differential signal received at the differential input since the impedance at node 526 can be made to be much smaller than the impedance at nodes 522 and 524. Specifically, the impedance at nodes 522 and 524 is usually 50 ohms each and the impedance at node 526 can be made as low as less than 5 ohms. The low impedance in the presence of capacitance of the output stage 530 allows high bandwidth operation dictated by the R-C time constant as one trained in the art would appreciate.

The amplifier stage 530 includes a second node 534 configured to be coupled to a signal ground. As will be described more fully below, the signal ground is not grounded to the TOSA header 502 upon which the circuit 500 is mounted. The amplifier stage additionally has a third node 536 coupled to a second node 544 of the optical transmitter 540.

The bias circuit 550 is coupled between an input signal bias and the fourth node 528 of the buffer stage 520, providing a common mode voltage to the output of the buffer stage. The common mode voltage is used to set the current of the amplifier stage 530 which is coupled to the optical transmitter 540.

The first node 542 of the optical transmitter 540 is configured to be electrically coupled to a voltage source 570.

Figure 5B:
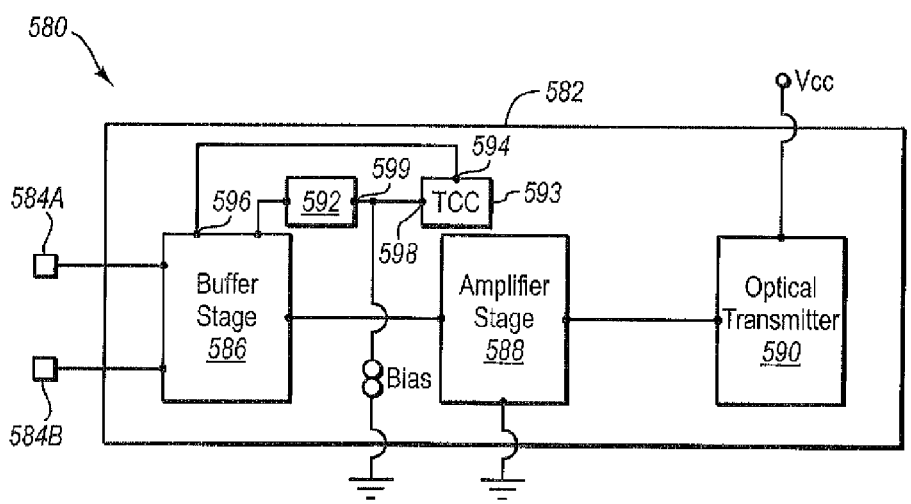
FIG. 5B is a block diagram of an active linear amplifier circuit, according to another embodiment.

With reference now to FIG. 5B, a block diagram illustrating a second embodiment of an example active linear amplifier circuit 580 is shown. The active linear amplifier circuit 580 can be mounted on a header 582 of a TOSA and/or ITM such as the TOSA 320 and/or ITM 420 of FIGS. 3 and 4, although this is not required. Note that the following description is for illustration only and should not be used to limit the scope of the appended claims or the embodiments disclosed herein.

The active linear amplifier circuit 580 of FIG. 5B is similar in many respects to the active linear amplifier circuit 500 of FIG. 5A. In particular, the active linear amplifier circuit 580 has two differential input nodes 584A and 584B, a buffer stage 586, an amplifier stage 588, optical transmitter 590, and feedback loop or bias circuit 592, all of which may be configured as explained above with respect to FIG. 5A. Additionally, the active linear amplifier circuit 580 includes a thermal chirp compensation ("TCC") circuit 593 having a first node 594 coupled to a fifth node 596 of the buffer stage 586. A second node 598 of the TCC circuit 593 is coupled to a second node 599 of the feedback loop or bias circuit 592.

Generally, the TCC circuit 593 operates to identify long strings of unchanging bit values (e.g., long strings of 1s and/or long strings of 0s) in the bit stream received at differential inputs 584A and 584B, which long strings of unchanging bit values can affect the chirp of the optical transmitter 590, depending on the type of optical transmitter implemented. The TCC circuit 593 compensates for this time-varying chirp via the feedback loop or bias circuit 592. The TCC circuit 593 will be explained in greater detail below.

Figure 6A:
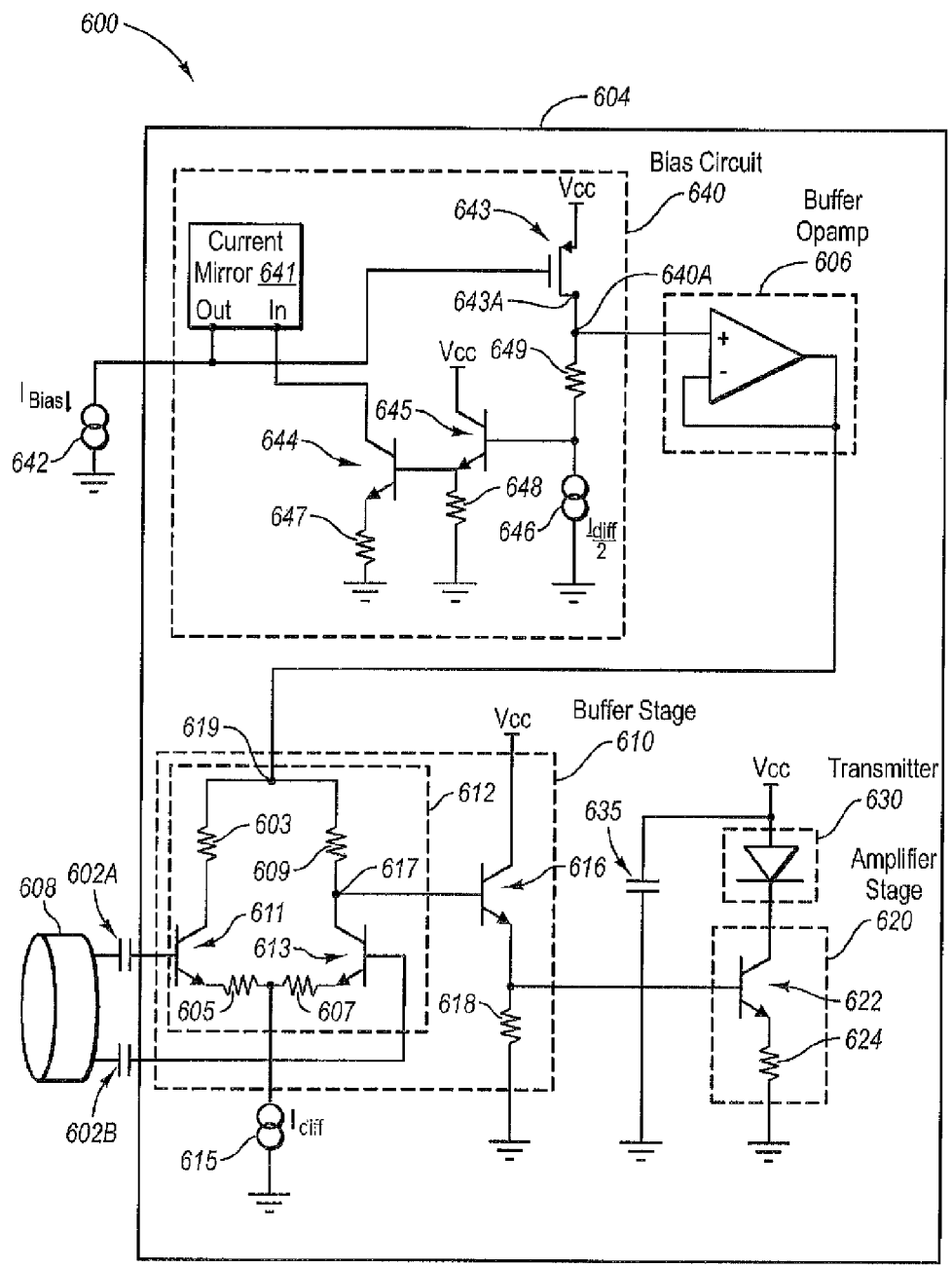
FIG. 6A is a schematic diagram of the active linear amplifier circuit of FIG. 5A.

Turning now to FIG. 6A, a specific embodiment 600 of the example active linear amplifier circuit 500 of FIG. 5A is schematically illustrated. The circuit 600 includes a buffer stage 610, an amplifier stage 620, an optical transmitter 630, and a feedback loop or bias circuit 640, each configured in accordance with the corresponding descriptions given above in connection with FIG. 5A. A differential signal is received by first input node 602A and second input node 602B from a driver output stage 608. In one embodiment, both input nodes 602A and 602B may comprise AC-coupling capacitors, although this is not required in all embodiments.

As shown, the driver output stage 608 is external to a TOSA or TOSA-like module within which the amplifier circuit 600 is implemented. In other embodiments, however, the driver output stage may comprise a driver portion of a CDR and driver implemented within a TOSA-like module, as explained above in connection with FIG. 4. In the latter case, the CDR and driver can be mounted on header 604 along with the amplifier circuit 600 and transmitter 630 with input nodes 602A and 602B provided for receiving the differential signal.

In the illustrated embodiment, the driver output stage 608 is illustrated as a current mode logic output stage. The current mode logic output stage is a differential output stage with two complementary output nodes, thus allowing the output stage 608 to take advantage of the speed and signal fidelity advantages of a differential output. It is noted that output stage 608 may include associated interconnecting transmission line with characteristic impedance matched to the current mode logic stage output impedance and the buffer stage 610's input impedance. This will be discussed further in the following section.

The first input node 602A and second input node 602B permit the differential signal to enter the confines of a header 604 upon which the circuit 600 is mounted. Although not shown, the header 604 is typically grounded to the chassis of a device in which the header is implemented. For instance, a TOSA or ITM having a header 604 may be implemented in an optoelectronic transceiver or transponder. In such a case, the header 604 would typically be grounded to the chassis of the transceiver or transponder.

The differential signal is terminated within the buffer stage 610 by a differential amplifier 612, also referred to herein as a "diffamp 612." As shown, the inverting input of the diffamp 612 is coupled to the first input node 602A while the non-inverting input is coupled to the second input node 602B. Generally speaking, the diffamp 612 may include one or more resistors 603, 605, 607, 609 and one or more transistors 611, 613. In the embodiment shown, the base terminal of transistor 611 is coupled to the inverting input of the diffamp 612, and the base terminal of transistor 613 is coupled to the non-inverting input of the diffamp 612. The collector terminals of the transistors 611, 613 are coupled to each other through resistors 603 and 609 and to the feedback loop or bias circuit 640 through buffer operational amplifier ("opamp") 606. The emitter terminals of the transistors 611, 613 are coupled to each other through resistors 605, 607 and are configured to be coupled to a current source 615.

Typically, the impedance of the input stage is chosen to match the impedance of a differential transmission line carrying the differential signal from the driver output stage 608 to the input nodes 602A and 602B. Alternately, when implemented within an ITM having a CDR and driver, where the distance between the CDR and driver to the active linear amplifier 600 is relatively small, it may be unnecessary to impedance match the impedance of the input stage of the diffamp 612.

As a result of the configuration of the diffamp 612 and the differential signal from the output stage 608, the output of the diffamp 612 is a single-ended signal, provided at an output node 617 of the diffamp 612. Output node 617 is then coupled to the base terminal of bipolar transistor 616 included within the buffer stage 610. The collector terminal of the transistor 616 is configured to be coupled to the power supply/voltage source, $V_{cc}$. Additionally, the buffer stage 610 includes a resistor 618 coupled to the emitter terminal of the transistor 616, the resistor 618 being used to bias the transistor 616. The resistor 618 is additionally configured to be coupled to signal ground.

As previously described, the buffer stage 610 is coupled to the amplifier stage 620. In the present embodiment, this is accomplished by coupling the emitter terminal of the transistor 616 to the base terminal of bipolar transistor 622 within the amplifier stage 620. The emitter terminal of the transistor 622 is configured to be coupled to a signal ground which does not need to be an RF ground. This is achieved in one embodiment by providing carefully designed decoupling circuits from power supply $V_{cc}$ to the signal ground. An example of such decoupling circuits is shown here as a decoupling capacitor 635. A first terminal of the decoupling capacitor 635 is coupled to a first terminal of the transmitter 630. A second terminal of the decoupling capacitor 635 is configured to be coupled to the signal ground.

Though not shown here in this specific example, a person knowledgeable in the art of electronics can envision that realistically a more complicated decoupling network can be implemented to address different ranges of frequencies of interest. This may mean that some of the decoupling circuits may reside on the driver IC and some may reside external to the driver IC. It is also conceivable that in addition to capacitors the decoupling circuit may consist of resistors and/or inductors (not shown here). Accordingly, the signal ground is external to the header 604 and consequently the signal ground is not connected to chassis ground when the circuit 600 is used in an optical transceiver or transponder. This can provide one or more advantages in operation which will be discussed in greater detail below.

The amplifier stage 620 also includes a second resistor 624 that is configured to couple the emitter terminal of the transistor 622 to the signal ground, thereby linearizing the circuit 600.

The amplifier stage 620 is coupled to the transmitter stage 630. In particular, in FIG. 6A a second terminal of the transmitter stage 630 is coupled to the collector terminal of the transistor 622 within the amplifier stage 620. The first terminal of the transmitter stage 630 is coupled to the decoupling circuit (including the decoupling capacitor 635) and is also configured to be coupled to the voltage source $V_{cc}$. The voltage source $V_{cc}$ provides current to the circuit 600.

The active linear amplifier circuit 600 additionally includes a feedback loop or bias circuit 640, coupled to a supply node 619 of the diffamp 612 within buffer stage 610 and to input signal bias 642, also referred to herein as bias current source 642. Bias current source 642 provides bias current for the amplifier circuit 600. The output of the bias circuit 640 is fed into the supply node 619 of the diffamp 612 through buffer opamp 606.

The bias circuit 640 may include a current mirror 641 with an input and an output. The output of the current mirror 641 is configured to be coupled to bias current source 642. The output of the current mirror 641 is also coupled to the gate terminal of a p-type metal-oxide-semiconductor ("PMOS") transistor 643. The drain terminal of the PMOS transistor 643 is coupled to the supply node 619 of the diffamp 612 through buffer opamp 606, and to the base terminal of a bipolar transistor 645 through resistor 649. The source terminal of the PMOS transistor 643 is configured to be coupled to the power supply $V_{cc}$. The base terminal of the transistor 645 is also configured to be coupled to a current source 646. The collector terminal of the transistor 645 is configured to be coupled to the power supply $V_{cc}$. The emitter terminal of the transistor 645 is coupled to the base terminal of the transistor 644. The emitter terminals of the transistors 644 and 645 are configured to be coupled to signal ground through resistors 647 and 648 respectively. The collector terminal of transistor 644 is coupled to the input of current mirror 641.

In operation, a differential signal is received from the driver output stage 608 by the buffer stage 610. The buffer stage 610 converts the differential signal to a single-ended signal and provides it to the amplifier stage 620, sending it from the emitter terminal of the buffer stage transistor 616 to the base terminal of the amplifier stage transistor 622. The amplifier stage transistor 622 pulls current through the transmitter 630, the magnitude of the current pulled through the transmitter 630 being directly proportional to the current received from the buffer stage transistor 616. Accordingly, the single-ended signal received from the buffer stage transistor 616 is amplified by the amplifier stage transistor 622 and the transmitter 630 emits an optical signal representative of the amplified signal. The electrical signals are returned to signal ground, the signal ground being separate from the header or chassis ground.

The bias circuit 640 and buffer opamp 606 are configured to operate as follows. The drain voltage of PMOS transistor 643 at node 643A essentially determines the collector current in transistor 644. This current is the input of current mirror 641. The output current of current mirror 641 is sunk into $I_{Bias}$ 642. In some embodiments, both $I_{Bias}$ 642 and current mirror 641 have high output impedance. As a result, any mismatch in the collector current of transistor 644 and the current $I_{Bias}$ 642 can greatly move the voltage at node 640A. For example, if the collector current of transistor 644 is higher than $I_{Bias}$ 642, then the voltage at node 640A will rise. This will in turn decrease the drain current of PMOS transistor 643. This makes the drain current less than $I_{diff/2}$ provided by current source 646. This in turns decreases voltage at node 643A. This results in lowering collector current of transistor 644 making this a negative feedback loop. Eventually, the bias circuit 640 can force the collector current of transistor 644 to be equal to $I_{Bias}$ 642. Thus, if the sizes of transistors and resistors and current sources in bias circuit 640, buffer stage 610 and output stage 620 are scaled properly, the collector current of transistor 622 (output stage current) can be programmed to be proportional to $I_{Bias}$ 642.

Figure 6B:
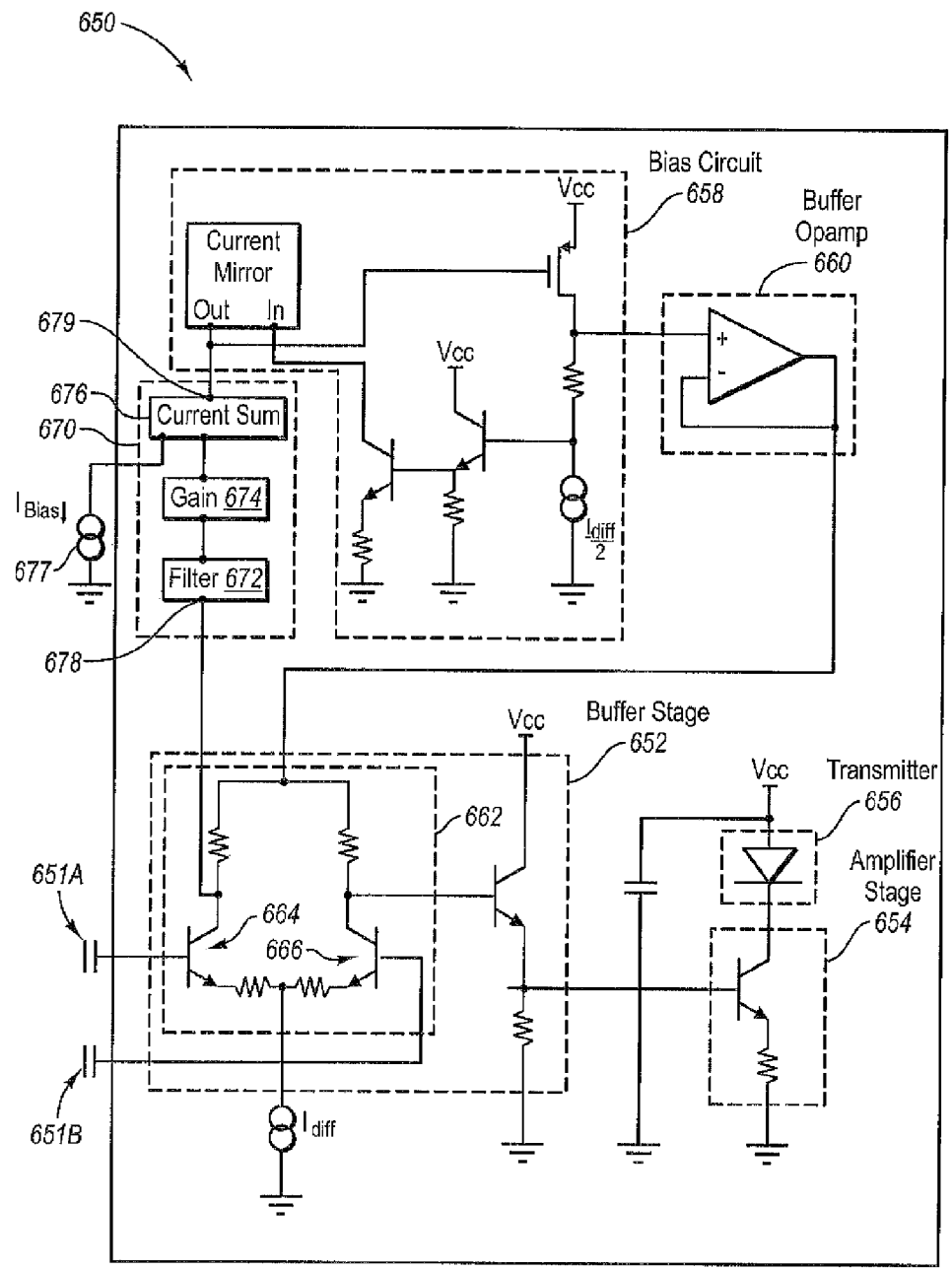
FIG. 6B is a schematic diagram of the active linear amplifier circuit of FIG. 5B.

Turning now to FIG. 6B, a specific embodiment 650 of the example active linear amplifier circuit 580 of FIG. 5B is schematically illustrated. The active linear amplifier circuit 650 includes two input nodes 651A and 651B for receiving a differential signal, a buffer stage 652, an amplifier stage 654, a transmitter stage 656, a feedback loop or bias circuit 658, and a buffer opamp 660, each configured in accordance with the corresponding descriptions given above, with modifications described below. Additionally, the active linear amplifier circuit 650 includes TCC circuit 670.

In the embodiment of FIG. 6B, the TCC circuit 670 includes a low pass filter 672 coupled in series to a gain stage 674, which in turn is coupled to a current summing circuit 676. The current summing circuit is additionally coupled to the bias current source 677 ("$I_{Bias}$ 677"). A first node 678 of the TCC circuit 670 is coupled to a diffamp 662 of the buffer stage 652. A second node 679 of the TCC circuit 670 is coupled to feedback loop or bias circuit 658.

In the embodiment of FIG. 6B, the diffamp 662 is configured slightly differently than the diffamp 612 of FIG. 6A. In particular, the collector terminal of transistor 664 is coupled to the first node 678 of the TCC circuit 670, in addition to being coupled to the collector terminal of transistor 666 and to the output of the buffer opamp 660. The configuration of the diffamp 662 enables a portion of the incoming differential signal (e.g., DATABAR) to be used by the TCC circuit 670 to compensate for thermal chirp in the transmitter 656.

Briefly, chirp is the frequency modulation of an emitted optical signal resulting when a transmitter is directly modulated. For instance, three types of chirp are exhibited by a directly modulated DFB laser (and other directly modulated semiconductor lasers): (1) transient chirp, (2) adiabatic chirp, and (3) thermal chirp. Transient chirp has a short-term damped oscillatory behavior and occurs at 1-to-0 and 0-to-1 bit transitions. Transient chirp is usually undesirable, but can be controlled to manageable levels through proper biasing of the transmitter. Adiabatic chirp is proportional to optical intensity, causing 1 bits to be blue-shifted relative to 0 bits. While undesirable in many instances, adiabatic chirp can be managed, and in fact is central to, using an ITM with a laser with managed chirp. Thermal chirp has the opposite sign of adiabatic chirp and has a delayed response to an applied current, the response increasing exponentially in time. Thermal chirp is generally undesirable.

Thermal chirp is affected by the mark density of a bit sequence. As used herein, "mark density" is the ratio of the number of 1 bits to the total number of bits that occur in a time period much longer than the bit period. For a truly random digital sequence, the mark density is ½ when averaged over a long period of time (e.g., seconds). However, the sequence may have segments in time where the local mark density, measured over a shorter period (e.g., nanoseconds) is higher or lower than the average. When a DFB laser is modulated by a random sequence, a high density of 1's will tend to heat the laser since the average injection current is increased. Conversely, a high density of 0's will tend to decrease the temperature of the active region of the DFB laser.

The laser frequency of a DFB laser changes with change in temperature because the refractive index of the semiconductor material is a function of temperature. Hence, the temperature of the laser and its optical frequency tend to wander over time in response to short term changes in the mark density of the random sequence. When the DFB is used in a laser with managed chirp transmitter, an optical spectrum reshaper ("OSR") converts this frequency wander to amplitude wander. Consequently, thermal chirp causes the amplitude of the 1 and 0 bits to change slowly at the output of the laser with managed chirp depending on the mark density of the applied sequence, and is undesirable in such a system.

This frequency wander can also cause another deleterious effect in data links with long lengths of optical fiber. Since the fiber is dispersive (i.e., since the velocity of light in the fiber varies with optical frequency), the frequency wander caused by thermal chirp can cause variations in the arrival time of the bits at the receiver. For normally dispersive fiber (i.e., positive dispersion), bits following a high density of 1's will arrive a little late because of the red shift induced by laser heating. On the other hand, bits following a high density of 0's will arrive a little early because of the blue shift induced by laser cooling. In other words, thermal chirp induces a pattern-dependent timing jitter in data links containing long lengths of dispersive fiber.

To compensate for thermal chirp, DATABAR is provided to the TCC circuit 670. Low pass filter 672 within the TCC circuit 670 receives DATABAR and increasingly attenuates DATABAR with increasing bit transitions. When DATABAR has very few (or no) bit transitions, it is passed through the low pass filter 672 with little or no attenuation. The output of the low pass filter 672 is amplified in a gain stage and added to the bias current from the bias current source 677 by the current summing circuit 676. The output of the current summing circuit 676 (e.g., the bias current plus thermal correction current) is fed into the feedback loop 658.

One skilled in the art will appreciate that the TCC circuit 670 is not required in all embodiments of the invention. For instance, an externally modulated laser (e.g., an electroabsorption modulator combined with a DFB), or "EML," can be implemented as the transmitter 656. Many EMLs have little or no thermal chirp. Consequently, the TCC circuit 670 may have little or no thermal chirp to compensate for in this example. Having said that, the TCC circuit 670 can nevertheless be included within the active linear amplifier circuit 650, even when implemented in conjunction with a transmitter 656 having limited or no thermal chirp.

It should be noted that the specific examples described above include bipolar transistors. However, the function can also be implemented with field-effect transistors (FET's) without altering the theory, spirit and advantages of the invention.

Figure 1:
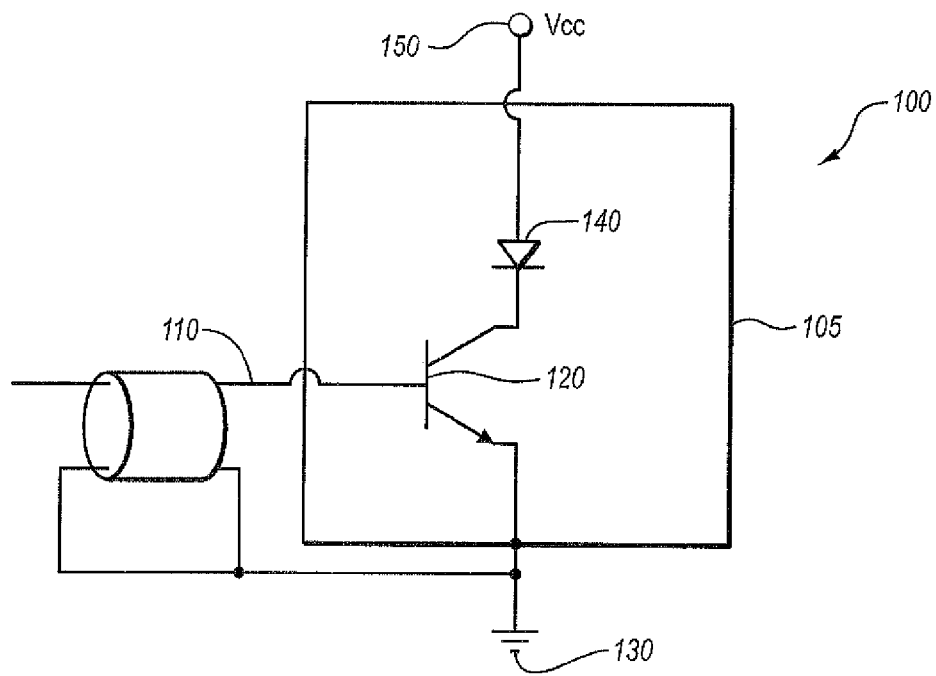
FIG. 1 illustrates a prior art amplifier circuit incorporated within a TOSA.

Various advantages result from the use of embodiments of an active linear amplifier circuit discussed above and illustrated in FIGS. 5A-6B. First, the signal ground is separate from the header/chassis ground. When a single-ended drive system is implemented as illustrated in FIG. 1 and the return ground signal is grounded to a header or chassis ground within an optical transceiver or other application, this can cause system problems. For instance, a system having numerous optical transceivers might share a common system ground to which the chassis ground of each transceiver is coupled. The return current for the single-ended drive system of each transceiver returns through the common ground, which can cause crosstalk between the signals. Other system problems can also result from returning a single-ended signal through the chassis ground. Another problem could arise when the chassis is subjected to an ESD stimulus. If the signal ground is connected to the chassis ground then the module in operation can take errors in the data. In many systems this is unacceptable. Accordingly, many applications require that the signal ground be separate from the header/chassis ground. One example application in which the present invention would be useful is the Enhanced 8.5 and 10 Gigabit Small Form Factor Pluggable Module (SFP+), requiring that the signal ground be separate from the header ground. See specification SFF-8431, available at ftp://ftp.seagate.com/sff/SFF-8431.PDF.

Second, there is no need for a good RF ground for the circuit 500, 580, 600, 650. Typically when a single-ended signal is provided from a driver to an amplifier circuit on a header, such as in FIG. 1, a good RF ground is required due to noise that can affect the signal as it travels over the transmission line. The RF ground must have high fidelity because it provides the return path for the signal. Advantageously, the signal provided from a driver to the circuit 500, 580, 600, 650 is a differential signal and does not require a good RF ground.

Figure 2:
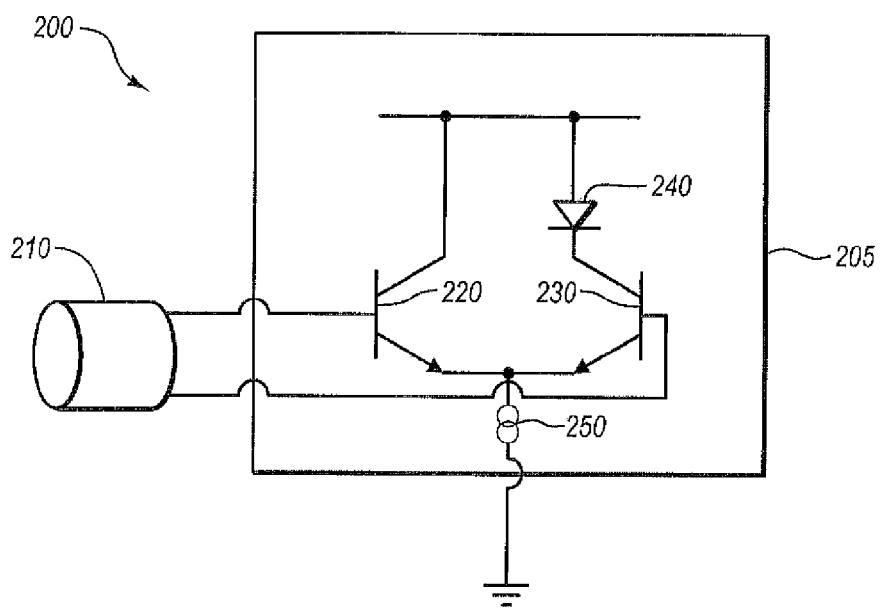
FIG. 2 depicts a prior art differential amplifier circuit incorporated within a TOSA.

Third, the circuit 500, 580, 600, 650 linearly amplifies the differential signal received from the driver. Current laser drivers include many features for shaping the differential signal prior to providing it to a TOSA to offset inherent laser imperfections and to produce an optimum module output. Alternately, wave-form shaping features may be provided by a driver integrated within an ITM. Using the circuit 500, 580, 600, 650, the shaped input signal to the TOSA (or the shaped input signal received from a driver integrated within an ITM) is only linearly amplified while the signal shape in time is maintained. In contrast, a differential amplifier TOSA circuit such as depicted in FIG. 2 normalizes the wave shape at its output to either a low level or a high level and in the process destroys the signal shape. Thus, any waveform shaping done on a signal prior to providing it to an active linear amplifier circuit 500, 580, 600, 650, such as amplitude boosting or jitter compensation, is preserved when the signal is linearly amplified in the active linear amplifier circuit, but is lost when differentially amplified using the circuit of FIG. 2.

Fourth, the magnitude of the differential signal received from a laser driver can be relatively small when using the circuit 500, 580, 600, 650 in comparison to the magnitude of the differential signal needed for the differential amplifier circuit of FIG. 2 because of the amount of amplification achieved with the circuit 500, 580, 600, 650. Generally, the voltage required to drive a differential signal depends both on the magnitude of the signal and the impedance of the transmission lines used to carry the signal; the voltage can be reduced by reducing either the signal magnitude or the transmission line impedance. In the case of the differential amplifier circuit of FIG. 2, the impedance of the transmission lines must be reduced so as not to exceed voltage headroom. However, manufacturing transmission lines with low impedance is more difficult than manufacturing transmission lines with high impedance. Advantageously, relatively high impedance transmission lines may be used in conjunction with the circuit 500, 580, 600, 650 because the differential signal can be relatively small.

Figure 7A:
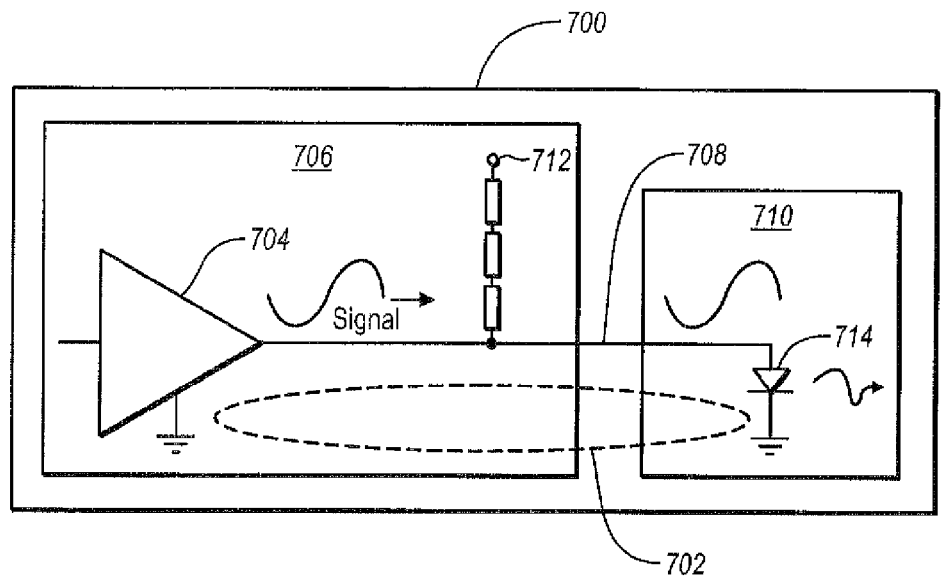
FIG. 7A illustrates a prior art EMI current loop generated in an optoelectronic device with a traditional TOSA.
Figure 7B:
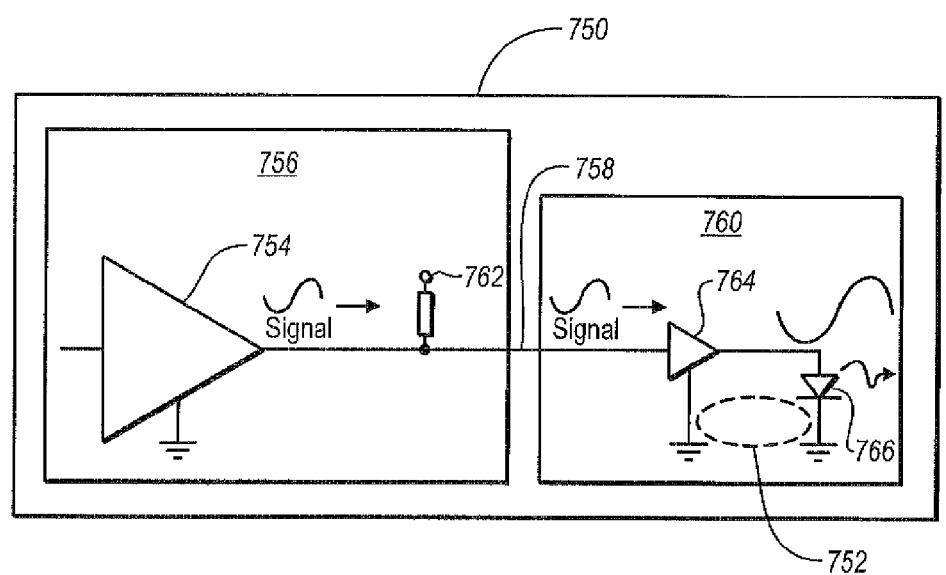
FIG. 7B illustrates an EMI current loop generated in an optoelectronic device with an active linear amplifier configured in accordance with one embodiment of the present invention.

Fifth, the electromagnetic interference ("EMI") emitted by an optoelectronic device with an active linear amplifier circuit 500, 580, 600, 650 within a TOSA or ITM is much less than the EMI emitted by an optoelectronic device with a traditional TOSA lacking an active linear amplifier circuit. This results because the EMI current loop within an optoelectronic device with an active linear amplifier circuit is much smaller than the EMI current loop within an optoelectronic device with a traditional TOSA, as illustrated in FIGS. 7A and 7B. It is understood that EMI is proportional to the drive current and the current loop.

FIG. 7A depicts an EMI current loop 702 in an optoelectronic device 700 with a traditional TOSA 710. A laser driver 704 is disposed on a PCBA 706 and provides a signal over transmission line 708 to the TOSA 710. A bias current 712 is provided in order to drive an optical transmitter 714 within the TOSA. The TOSA 710 either lacks an amplifier or has an amplifier providing less amplification than an active linear amplifier circuit.

FIG. 7B depicts an EMI current loop 752 in an optoelectronic device 750 having a TOSA (or ITM) 760 with an active linear amplifier circuit. The device 750 has a laser driver 754 disposed on a PCBA 756 providing a signal over a transmission line 758 to the TOSA 760. The signal provided by the driver 754 is amplified by an active linear amplifier circuit 764 configured in accordance with the circuit 500, 580, 600 or 650 of FIGS. 5A-6B and is provided to an optical transmitter 766. A bias current 762 is also provided in order to bias the circuit 764 and optical transmitter 764 within the TOSA 760.

Because the TOSA 760 includes the active linear amplifier circuit 764, the magnitude of the bias current 762 needed to bias the circuit 764 and optical transmitter 766 is relatively small when compared to the bias current 712 needed to bias the optical transmitter 714 in the traditional TOSA 710. Consequently, the magnitude of the signal provided over the transmission line 758 to the TOSA 760 is small compared to the magnitude of the signal provided over the transmission line 708 to the traditional TOSA 710 and any EMI emitted by the transmission line 758 may be considered negligible.

Within the optoelectronic device 700 implementing the traditional TOSA 710, the EMI current loop 702 carrying a strong signal is defined by the signal path from the driver 704 to the optical transmitter 714 and back through ground. In contrast, within the optoelectronic device 750 implementing the TOSA 760, the EMI current loop 752 carrying a signal of comparable magnitude is defined by the signal path from the active linear amplifier circuit 764 to the optical transmitter 768 and back through ground. While not drawn to scale, the size of an EMI current loop 752 within a TOSA having an active linear amplifier will typically be much smaller than the size of an EMI current loop 702 within an optoelectronic device having a traditional TOSA because in the TOSA with the active linear amplifier, the optical transmitter is positioned proximate to the active linear amplifier. This results in the emission of less EMI from an optoelectronic device according to embodiments of the invention relative to an optoelectronic device having a traditional TOSA.

The discussion of FIGS. 7A through 7B highlights other advantages of an active linear amplifier circuit. For instance, the relatively small signal used to drive the TOSA 760 still originates from a driver that must be impedance matched to the TOSA 760 for good signal integrity. However, because the drive signal is relatively small, the power required to do this is insignificant. Additionally, the laser is connected directly to the amplifier output so it can be driven with the minimum drive current without the need for impedance matching.

A further benefit of the active linear amplifier circuit is that the optical transmitter is biased by the amplifier circuit and all the bias components associated with this can be contained within the TOSA. This simplifies the module PCBA by eliminating the need for having laser biasing components on the PCBA. An optoelectronic device using a traditional TOSA biases the optical transmitter using many external components on the PCBA. These bias networks are generally complex and difficult to design because the high speed signal transmitted between the laser driver and the laser is very sensitive to their loading effects. The amplifier circuit according to embodiments of the invention requires a bias current but it is very small compared to a traditional TOSA bias current and it can be provided easily without negatively impacting the high speed signal.

While the benefits of an active linear amplifier circuit have been discussed in the context of a TOSA, some or all of the discussed benefits may also be obtained by implementing an active linear amplifier circuit within an ITM according to the embodiment of FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmitter module comprising:
a buffer circuit including a differential amplifier configured to receive a differential signal including a first input signal and a second input signal complementary to the first input signal and to output a single-ended signal on an output node;
a bias circuit coupled to the buffer circuit, the bias circuit including a thermal chirp compensation circuit;
an amplifier circuit coupled to the output node and configured to linearly amplify the single-ended signal; and
an optical transmitter coupled to the amplifier circuit and configured to be driven by the amplified single-ended signal.

2. The transmitter module of claim 1, further comprising a header, upon which the differential amplifier, the amplifier circuit, and the optical transmitter are mounted, the header being electrically coupled to a chassis ground, wherein the amplifier circuit is not coupled to the chassis ground.

3. The transmitter module of claim 2, wherein the amplifier circuit is coupled to a signal ground that is not coupled to the chassis ground.

4. The transmitter module of claim 1, wherein the buffer circuit further includes a buffer transistor coupled between the differential amplifier and the amplifier circuit.

5. The transmitter module of claim 1, wherein, in operation, the first and second input signals are received from a laser driver configured to perform waveform shaping on the first and second input signals and the linearly amplified single-ended signal preserves the waveform shaping performed by the laser driver.

6. A transmitter optical subassembly that includes the transmitter module of claim 1.

7. A transmitter module comprising:
a differential amplifier including:
a first differential transistor that includes a base, the base configured to receive a first input signal of a differential signal pair;
a second differential transistor that includes a base, the base configured to receive a second input signal of the differential signal pair that is complementary to the first input signal;
a first emitter resistor coupled between an emitter of the first differential transistor and a current source;
a second emitter resistor coupled between an emitter of the second differential transistor and the current source;
a first collector resistor coupled to a collector of the first differential transistor at a first node; and
a second collector resistor coupled to a collector of the second differential transistor at a second node, the first and second collector resistors being coupled to a third node;
a linear amplifier circuit configured to receive a single-ended signal provided by the first node;
a bias circuit including a thermal chirp compensation circuit, the bias circuit being coupled to the third node and the bias circuit being configured to provide an adjusted bias voltage to the third node; and
an optical transmitter coupled to the linear amplifier circuit.

8. The transmitter module of claim 7, further comprising a header, upon which the differential amplifier, the linear amplifier circuit, and the optical transmitter are mounted, the header being electrically coupled to a chassis ground, wherein the linear amplifier circuit is not coupled to the chassis ground.

9. The transmitter module of claim 7, further comprising a buffer circuit that includes the differential amplifier, the buffer circuit coupled to the linear amplifier circuit and configured to provide the single-ended signal to the linear amplifier circuit.

10. The transmitter module of claim 9, wherein the buffer circuit further comprises a buffer transistor, a base of the buffer transistor coupled to the first node and an emitter of the buffer transistor coupled to the linear amplifier circuit.

11. The transmitter module of claim 10, wherein the emitter of the buffer transistor is further coupled to a buffer resistor and a collector of the buffer transistor is coupled to a voltage source.

12. The transmitter module of claim 10, wherein the linear amplifier circuit includes a amplifying transistor, a base of the amplifying transistor coupled to the emitter of the buffer transistor and a collector of the amplifying transistor coupled to the optical transmitter.

* * * * *